Dec. 31, 1968     F. YAKLYVICH     3,418,742
FISHING ROD HANDLE
Filed July 1, 1966     Sheet 1 of 2
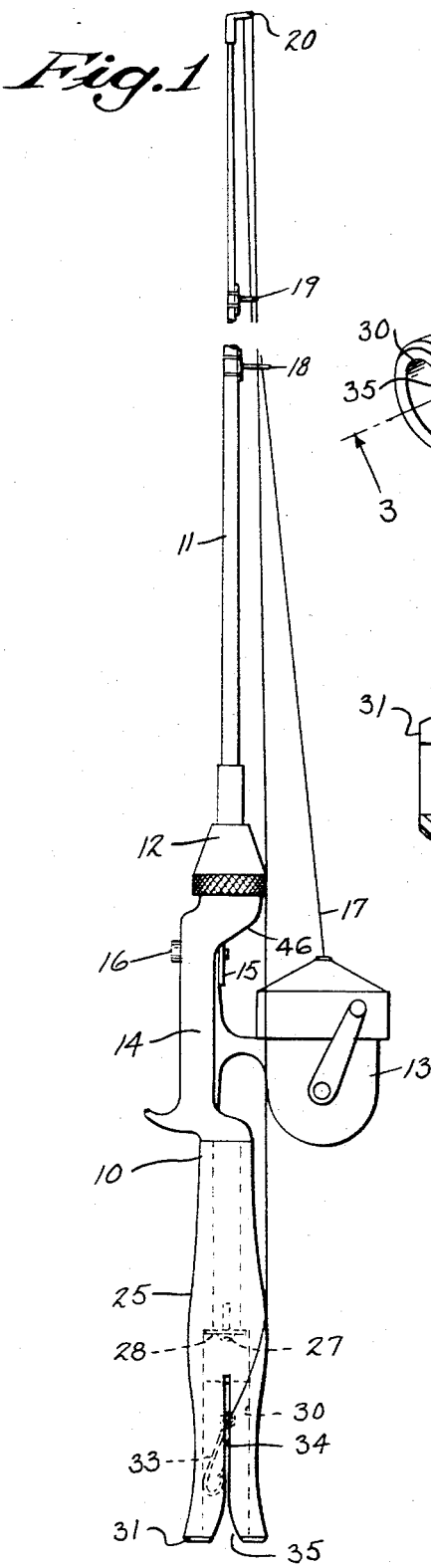
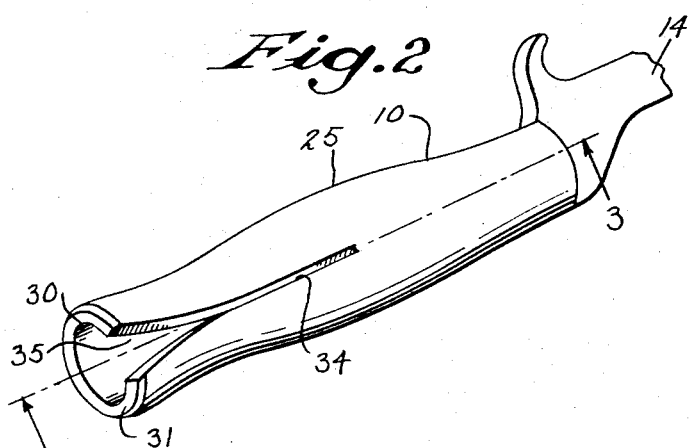
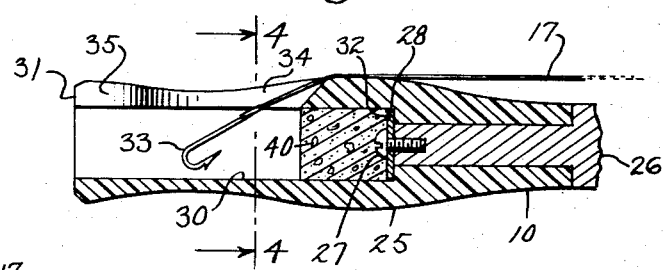
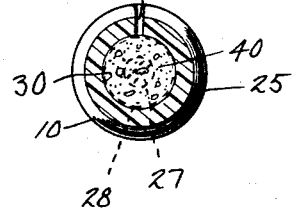
INVENTOR
FRANK YAKLYVICH
BY
ATTORNEY

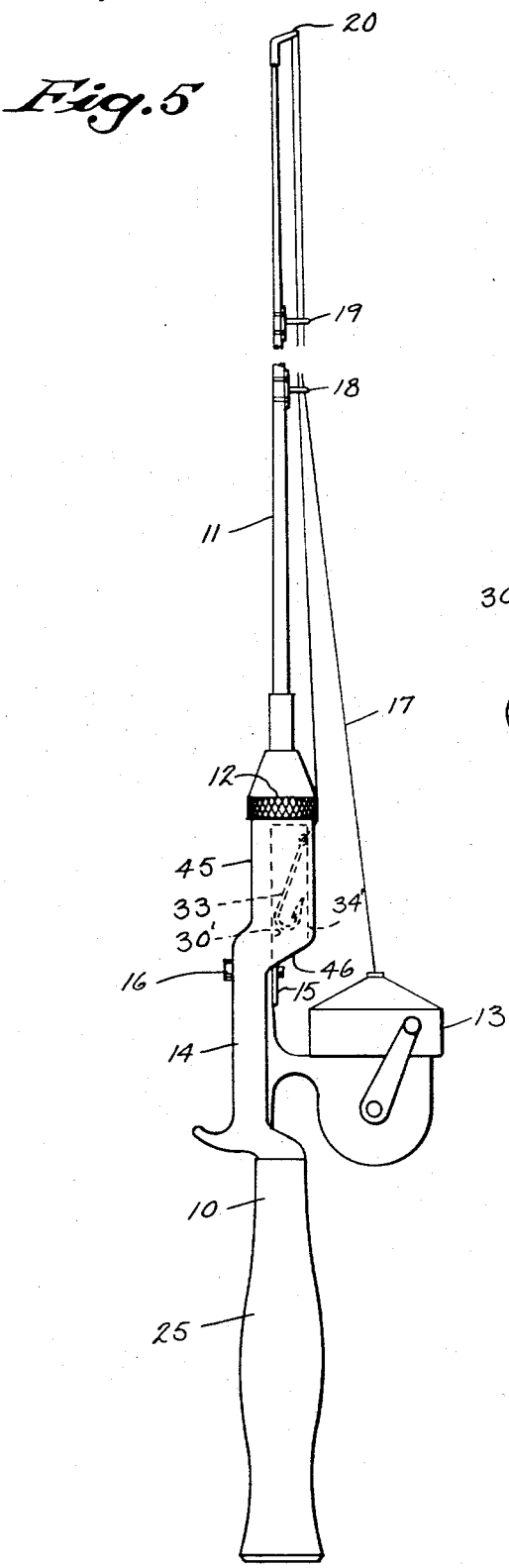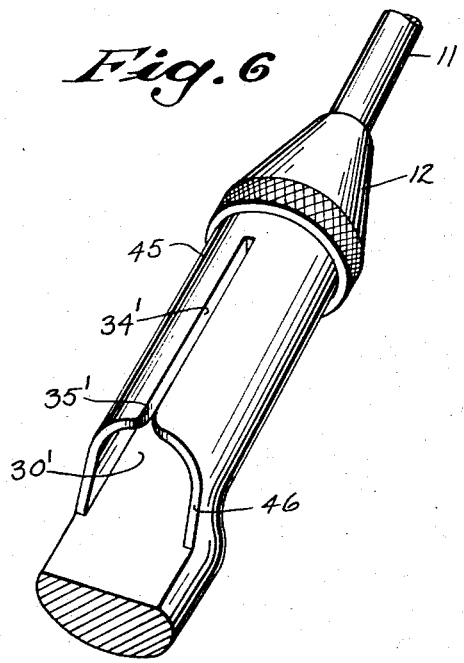

United States Patent Office 3,418,742
Patented Dec. 31, 1968

3,418,742
FISHING ROD HANDLE
Frank Yakiyvich, Rte. 2, Silver City,
Ontonagon County, Mich.
Filed July 1, 1966, Ser. No. 562,317
7 Claims. (Cl. 43—25.2)

ABSTRACT OF THE DISCLOSURE

A fishing rod handle having an internal storage cavity formed as an integral part of the handle in one of two axially aligned portions of the handle. The cavity has two access openings, one of which is a longitudinal slit, at an angle to each other. Because the openings are not covered, the storage cavity is always readily accessible to the user of the rod.

This invention relates to fishing rod handles; more particularly, it relates to a fishing rod handle construction which includes storage space for a hook, bait or lure attached to the end of a fishing line strung on the rod. The handle construction may also include an absorbent pad for holding water to provide for the temporary storage of live bait under conditions which will aid in preserving its freshness.

Objects of the invention

In many instances, a fisherman may desire to transport or store a fishing rod after a lure, hook, or bait, has been attached to the line. With the type of fishing rod handle in general use at the present time, this can only be done with the hook or lure in an exposed position. This can be dangerous by making it easy for fishermen to catch their hand on the exposed hook or lure, and can be a particular problem with children. Furthermore, when walking along streams in heavy brush, it is possible to snag an exposed hook on bushes or trees, and when a fisherman sets his rod down in a boat, the exposed hooks may also present potential safety hazards. One of the principal objects of this invention is to provide a fishing rod handle which has an inner cavity that is adapted to receive the end of a fishing line strung on the rod in order to store a hook, lure or other appliance on the end of the line inside the handle so it will not be exposed. A further main object is to accomplish the foregoing without requiring that the rod be taken apart.

Another main object is to provide a handle of the foregoing construction wherein the cavity is to positioned as to make it readily accessible and to provide slot means communicating with the cavity for facilitating the insertion of an article into the cavity.

Still another main object is to provide a handle of the foregoing construction in which the cavity contains an absorbent pad which can hold water and act as a bait freshener, thereby lending the handle to the temporary storage of live bait.

One of the more specific objects of this invention is to provide the new or improved details of fishing rod handle constructions hereinafter claimed.

Prior art

At least one form of a fishing rod handle constructed to permit the storage of hooks is disclosed in the prior art in U.S. Patent 2,673,416, which shows a rather complicated mechanical structure that is only adapted to hold a hook, and would be difficult and expensive to manufacture. Other main objects of my invention are to provide a handle that is of simple construction which will facilitate manufacture on a commercial scale without incurring undue costs, that will also be adapted to hold lures larger than the usual type of fishing hook, and that will be further adapted to admit the storage of live bait.

Summary of Invention

Briefly speaking, the fishing rod handle of my invention includes a cavity which has an opening towards the butt end of the handle and extends inwardly therefrom. A slot is provided through the handle wall surrounding the cavity, which slot communicates with the cavity and receives the end of the leader or fishing line so that a hook, bait, lure or other item on the end of the line can be inserted into the cavity. To further facilitate the insertion of an item into the cavity, the end of the slot nearest the opening of the cavity facing the butt end of the handle can have a flared or enlarged portion. In order to provide for storage of live bait, a pad of sponge or similar water-absorbing material can be included inside the cavity and when moistened with water, worms or other live bait on the fising line can be stored in a moist condition which will aid in preserving them.

The above-mentioned and other more specific objects will appear in the description which follows. In the description, reference is made to the accompanying drawings which form a part hereof and in which there is shown, by way of illustration and not of limitation, two specific forms in which the invention may be practiced. These forms will be described in sufficient detail to satisfy the statutory requirements, but it is to be understood that other embodiments of the invention may be used and that structural changes in the embodiments described herein may be made by those skilled in the art without departing from the scope of the present invention. The same reference numeral is used to refer to the same part throughout the several drawings, in which:

FIG. 1 is a side view of a fishing rod, with a portion broken away, incorporating a handle according to the present invention;

FIG. 2 is a perspective view of the fishing rod handle of this invention;

FIG. 3 is a sectional view taken along the plane of line 3—3 of FIG. 2;

FIG. 4 is a vertical sectional view taken along the plane of line 4—4 of FIG. 3;

FIG. 5 is a view similar to FIG. 1 showing a second form in which my invention may be embodied; and FIG. 6 is a perspective view of part of the handle member of the rod shown in FIG. 5.

Referring now to FIG. 1, there is shown a fishing rod comprising a handle member 10 adapted for connection to a rod member 11, the two being joined by means of a conventional threaded chuck 1. A reel 13 is joined to a reel seat 14 formed as one part of the handle member 10, the reel being secured to the handle by any conventional means such as with one end of the reel held in position by a sliding block 15 and its co-operating thumb screw 16 and the other end abutting a stop formed as part of the reel seat; other means of securing the reel to the handle portion are well-known. A fishing line 17 is wound on the reel 13 and extends through guides 18, 19 and 20 secured to the rod member 11 of the fishing rod.

At the end of the handle member 10, there is formed a grip portion 25, which is usually covered with cork, plastic or other non-slipping material so as to provide a secure hand grip. As best seen in FIG. 3, the grip portion 25 may be secured to a shank 26 extending from the reel seat 14 of the handle member 10 by means of a threaded screw 27 and washer 28.

The fishing rod construction described to this point is of conventional type and FIG. 1 represents what is generally referred to as a "spin-casting" rod, with the reel 13 being of the so-called spin-casting type. It is pointed out, however, that the present invention may be used with any desired type of fishing rod including, but not limited to, fly rods, casting rods, and spinning rods. As to materials, the usual types of fiberglass, wood or metal rods can be utilized and the grip portion 25 of the handle member can be of cork, plastic, metal, wood, etc., or other materials suitable for fishing rod constructions.

The present invention relates solely to the construction of the handle member 10 of the fishing rod illustrated in FIG. 1. In order to satisfy the objects of this invention, the handle member 10 is provided with an internal cavity 30 which, in the form shown herein, extends from the end 31 of the handle member partway through the grip portion 25 and has an internal forward (regarding the butt end of the rod as the rear) wall 32 against which the washer 28 bears as indicated in FIG. 3. Thus the cavity opens on the butt end of the handle member 10 and extends inwardly or forwardly therefrom. The purpose of the internal cavity is to provide a storage compartment for whatever is carried on the end of fishing line 17, shown in the drawings as being a hook 33, although the cavity is preferably of such size as to be able to accommodate a small lure and live bait.

In order to provide access to the cavity 30, a slot 34 is formed in the wall of the handle member 10 surrounding the cavity and extends longitudinally of the handle and through the wall so as to communicate with the cavity 30. Near the butt end of the rod, the spaced walls of the slot 34, which are parallel throughout the major portion of their length, are flared apart, or diverge, as at 35 so as to provide a notch portion adjacent the butt end 31 of the handle member 10.

The construction of the end of the handle member 10 of the fishing rod is best disclosed in its entirety in FIG. 2. The internal cavity 30 is shown as extending from the butt end 31 of the rod inwardly of the handle member 10, and the slot 34 can be seen as extending through the wall of the handle member surrounding the cavity 30. The notch portion 35 at the butt end of the slot 34 is also clearly depicted in this drawing.

Referring again to FIG. 1, when the fisherman wants to stop fishing, the cavity 30 provides a compartment in which he can store the hook or other appliance attached to the end of his line. To accomplish this, the fishing line is led backward from the tip guide 20 until the end of the line reaches to the end of the handle member, and the fishing line or leader to which the hook 33 is attached is inserted through the notch 35 into the slot 34 with the hook 33 disposed inside the internal cavity 30. The line is then moved forwardly along the slot 34 until the hook 33 is at the forward end of the cavity. In this fashion, the hook 33 is enclosed inside the handle of the rod and there is no danger of the hook snagging brush or clothing or sticking in the hand of the fisherman. The rod can be safely transported with the hook remaining attached to the line and the line remaining strung on the rod so that the rod can be made ready for fishing merely by sliding the hook out of the cavity. As stated previously, the cavity 30 can be made large enough so as to accommodate lures, small plugs, flies, and even live bait such as minnows or worms which might be attached to the hook at the end of the rod. In the normal instance, for example, the cavity can be made from 2 to 4 inches deep and ¾ inch in diameter in order to attain the desired purpose, although the size of the cavity can vary from these dimensions in any particular application of this invention. The act of inserting the hook, or other article, into the cavity 30 is quick. The flared notch 35 at the butt end of the slot 34 further facilitates the insertion. Also, in an appropriate instance, the shank end of the hook may be inserted through the slot 34 rather than the fishing line or leader attached to the fishing line.

An added useful feature of the present invention is best indicated in FIG. 3 wherein a plug 40 of sponge or other suitable water-absorbent material, which may be hollow or solid, is inserted in the forward end of the cavity 30. When the water-absorbent plug 40 is wet with water, it can be used as a bait freshener. Thus when worms, minnows or other live bait are used on the hook 33, the moistened water-absorbent plug 40 aids in keeping them fresh by providing a moisture atmosphere inside the cavity 30. It is pointed out, however, that the handle construction of the present invention may be utilized without the water-absorbent plug 40 and this is an optional feature providing additional utility.

In FIGS. 5 and 6 there is shown a second embodiment of my invention wherein the cavity 30' is defined in a forward portion of the fishing rod handle member 10. In the fishing rod as illustrated in FIG. 5, the handle member 10 includes a forward portion 45 which is of generally cylindrical configuration as is the grip portion 25 of the handle member. The forward portion 45 has a rear wall 46 which faces toward the butt end of the handle, and the rod member 11 is attached to the front of the forward portion by means of the chuck 12. The reel seat 14 is defined between the grip portion 25 and the forward portion 45 of the handle. As indicated in these two figures, the internal cavity 30' is defined in the forward portion 40 and opens on the rear wall 46 thereof so as to have an opening which faces the butt end of the handle. The slot 34', which may include the flared portion 35', is defined in the wall of the forward portion 45 surrounding the cavity 30' and extends therethrough to communicate with the cavity. A hook 33, attached to the line 17, is shown as being inserted into the cavity 30' in the manner previously described in connection with FIGS. 1–4. Thus in all respects, the manner of inserting the lure, bait, hook or other appliance attached to a fishing line, into the cavity 30' when located in the forward portion 45 is the same as that when the cavity is located in the grip or rear portion 25 of the handle. Positioning of the cavity 30' in the forward portion has an advantage in that the user does not have to string line behind the reel when inserting an article in the cavity. In general, where it is desired to use a cavity at this portion of the handle, it will be necessary to provide a forward portion 45 which is slightly longer than would be the case as in the rod shown in FIG. 1 where the forward portion is used principally as a structural means for attaching the handle to a rod. Although not shown in these two drawings, the cavity 30' may also include a water absorbent plug 40 when positioned in the forward portion of the rod.

There has thus been provided fishing rod handle constructions capable of satisfying the several objects previously set forth. In carrying out the general concept of this invention, the handle member of a fishing rod is provided with an interior cavity that opens towards the butt end of the handle. Access to the cavity is provided by a slot extending through the wall of the handle member surrounding the cavity. A portion of the fishing line or leader, or an article attached to the end of the line or leader, can be inserted in the slot so that the end of the line or an article on the end of the line may be stored inside the cavity. In this position, any hook, or other potentially dangerous appliance attached to the line can be kept enclosed and out of reach, thereby preventing parts of the body from being stuck on the hooks or preventing the hooks from engaging brush, trees or other articles. In order to facilitate access, the end of the slot along the open end of the cavity may be provided with a flared or notched-shaped portion. As a further additional utilitarian feature, a water-absorbent plug may be inserted inside the cavity and wet with water in order to provide at least temporary storage for fresh bait such as minnows and the like that might be carried on the end of the line. The handle constructions of this invention are of simple configuration which lend themselves to relatively facile manufacture, unlike more complicated prior art constructions.

While two embodiments of this invention have been shown herein, it is anticipated that those skilled in the art will be able to modify various of their structural features, and devise other embodiments. It is to be understood that it is intended to cover all changes and modifications of the examples herein chosen for the purpose of illustration and other embodiments.

I claim:

1. For a fishing rod, a handle member having an exposed grip surface, an exposed butt end at an angle to the exposed grip surface, and a forward end adapted for connection to a rod member, said fishing rod handle member including:
   (1) a cavity defined internally of the handle member in a portion thereof near its butt end, said cavity having an opening on the exposed butt end of the handle member and extending inwardly therefrom; and
   (2) a slot defined in the wall of the handle member surrounding said cavity and extending through said wall to communicate with the cavity, said slot opening on the exposed grip surface of the handle member; thereby providing a storage cavity in the handle member to which access is always available through the slot and the cavity opening on the butt end.

2. An article of manufacture as defined in claim 1 wherein the slot is formed of a pair of spaced walls parallel to one another for a portion of their length and divergent from one another adjacent the butt end of the handle member.

3. An article of manufacture as defined in claim 1 further including:
   a plug of water-absorbent material disposed inside the cavity.

4. An article of manufacture as defined in claim 3 wherein the slot is formed of a pair of spaced walls parallel to one another for a portion of their length and divergent from one another adjacent the butt end of the handle member.

5. For a fishing rod, a handle member having a generally cylindrical rear portion and a generally cylindrical forward portion, the rear portion having an exposed surface and an exposed butt end at an angle thereto, the forward portion having an exposed surface and an exposed rear wall at an angle thereto facing said butt end, the forward portion being adapted for connection to a rod member along its forward end, said fishing rod handle member including:
   (1) a cavity defined internally of the handle member in one of said portions and axially aligned with the other of said portions, said cavity having an opening facing towards the butt end of the handle member and extending inwardly of the handle member from the aforesaid opening; and
   (2) a slot defined in the portion of the handle member surrounding said cavity and extending therethrough to communicate with the cavity, said slot commencing at said opening of the cavity facing the butt end of the handle member and extending forwardly therefrom, and said slot also opening on the exposed surface of the portion in which it is formed; thereby providing a storage cavity in the handle member to which access is always available through the slot and the cavity.

6. An article of manufacture as defined in claim 5 wherein the cavity is defined in the forward portion of the handle member, and the slot includes wall portions that diverge from one another adjacent the opening of the cavity facing the butt end of the handle member.

7. An article of manufacture as defined in claim 6 wherein a plug of water-absorbent material is disposed inside the cavity.

References Cited

UNITED STATES PATENTS

| | | | |
|---|---|---|---|
| 891,055 | 6/1908 | Frost | 43—57.5 |
| 1,216,069 | 2/1917 | Cammack | 43—25.2 |
| 1,634,030 | 6/1927 | Korkames | 43—25.2 X |
| 2,514,645 | 7/1950 | Jardine | 43—25.2 |
| 2,527,625 | 10/1950 | Fields | 43—25.2 X |
| 2,691,840 | 10/1954 | Smith | 43—25.2 |
| 2,699,623 | 1/1955 | Pragalz | 43—25.2 |

FOREIGN PATENTS 170,761   3/1952   Austria.

SAMUEL KOREN, *Primary Examiner.*

J. H. CZERWONKY, *Assistant Examiner.*

U.S. Cl. X.R.

43—23